United States Patent [19]
Eberle

[11] 3,729,799
[45] May 1, 1973

[54] BATTERY TESTING AND CRIMPING DEVICE
[75] Inventor: William J. Eberle, Reading, Pa.
[73] Assignee: General Battery Corporation, Reading, Pa.
[22] Filed: Oct. 21, 1971
[21] Appl. No.: 191,249

[52] U.S. Cl. ...................................29/204, 29/592
[51] Int. Cl. ........................H01m 35/18, H01s 4/00
[58] Field of Search ...............29/592, 204 D, 204 R, 29/203 D, 208 D, 204

[56] References Cited
UNITED STATES PATENTS
3,508,318  4/1970  Clingenpeel et al. ...............29/204 D Primary Examiner—Thomas H. Eager
Attorney—Henry N. Paul, Jr. et al.

[57] ABSTRACT

Batteries having posts that are welded together across cell partitions are mechanically crimped by a novel apparatus that moves crimping jaws into engagement with post portions to engage the cell partitions to prevent release upon inverting the batteries, such crimping being done substantially simultaneously with respect to a plurality or all of the welded posts that traverse cell partitions, and with these weldments being checked for electrical conductivity, preferably during such crimping operation, as a sequential check, with electrical probes that check the posts for electrical continuity being substantially simultaneously applied to the several posts of a battery.

20 Claims, 6 Drawing Figures

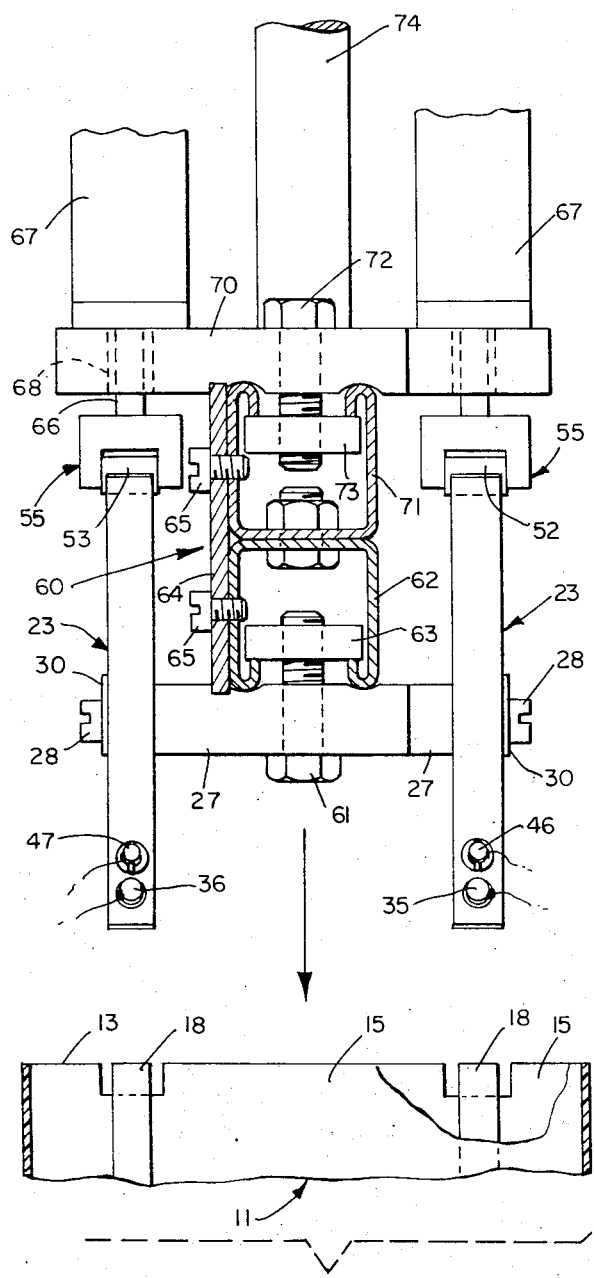
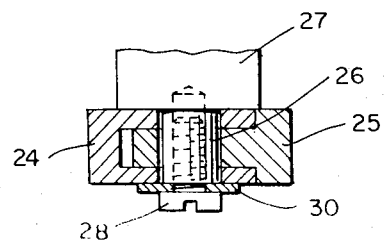
Fig. 2
Fig. 5
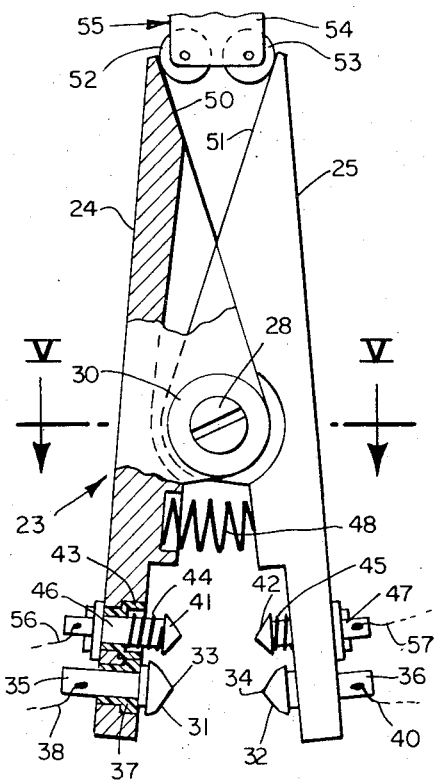
Fig. 3
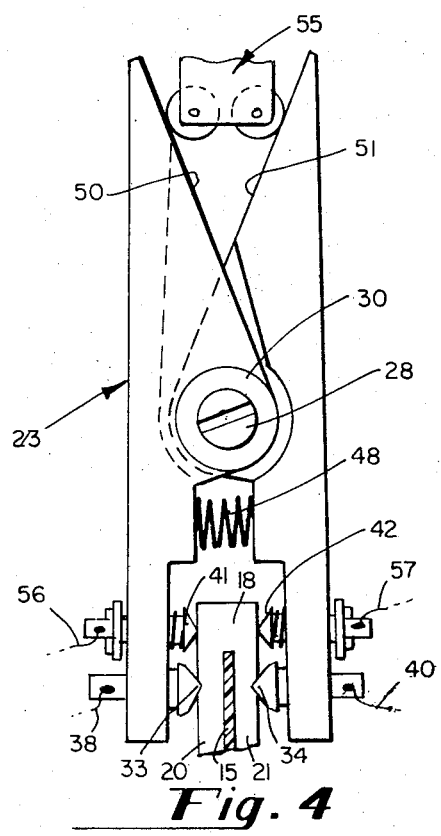
Fig. 4

3,729,799

BATTERY TESTING AND CRIMPING DEVICE

BACKGROUND OF THE INVENTION

In the art of battery manufacture, batteries are conveyed along a predetermined path, such as, along a roller conveyor, and are open topped, with cell partitions extending across the sides of the battery, separating adjacent cells, and with plates of adjacent cells being connected by a suitable strap, that in turn, has an upstanding lug, with upstanding lugs of straps in adjacent cells being disposed close to, but separated from each other by an upper end of the partition, with such lugs protruding upwardly above their partitions, for welding adjacent lugs together to form a battery cell post for each such pair of adjacent lugs. Accordingly, where there are six separate cells in a battery, there will be five battery cell posts of this type. These posts can either be welded by hand, or they can be automatically machine welded, if desired.

After the post weldments are effected, it is desirable to invert the batteries and place them onto a cap, with the cap subsequently being sealed to the battery. However, upon inverting the batteries, care must be taken that the plates and connected straps and posts do not slide along the cell partitions, and slide out of the battery as the open upper end of the battery is inverted. Accordingly, the present invention is directed toward providing a device that will automatically and mechanically engage the welded battery cell posts and crimp them so that the posts positively physically engage the battery cell partitions to prevent the plates from falling from the battery upon inverting the battery. Also, this crimping operation may be simultaneously effected by the use of a plurality of crimping devices that concurrently engage each of the posts of a battery and crimp the same.

Also, in the art of battery manufacture, wherein battery cell posts are constructed as aforesaid, it is often desirable to provide an electrical check for continuity, or conductivity across the welded posts, to check that there is not an open circuit between opposite sides of the weldments, and to assure that the resistance of the weld does not exceed a predetermined limit that would interfere with the desired conductivity, and in some cases to determine precisely the resistance across welded portions of the posts.

The present invention is also directed toward providing probes that are adapted to engage the welded battery posts, on opposite sides of the weldments thereof, and wherein such engagement is substantially simultaneously effected with respect to each post, and appropriate circuitry is connected thereto, in order to sequentially check the individual posts seriatim for continuity, followed by removal of the devices that carry the crimping jaws and probes, simultaneously.

This latter-mentioned means of electrically checking the continuity of the posts eliminates the necessity of checking the same by hand, and therefore amounts to a great time saving device, in that testing no longer requires hand manipulation of probes held by an operator. Furthermore, in accordance with this invention, there is no necessity for crimping by hand at a separate station.

SUMMARY OF THE INVENTION

The present invention is directed toward providing a device for mechanically crimping battery cell posts to partition plates, and preferably for doing the same simultaneously to a plurality of posts, and for providing an efficient electrical continuity check across weldments of battery cell posts.

It is accordingly, a primary object of this invention to provide a novel crimping device, for crimping of battery cell posts to associated partitions, as well as to provide a method of securing battery cell posts to partitions.

It is a further object of this invention to provide a novel apparatus for simultaneously crimping a plurality of battery cell posts to their partition plates.

It is a further object of this invention to provide a novel device for checking the electrical continuity across battery cell post weldments, or other connections of electrically conductive components.

It is a further object of this invention to provide a combination apparatus that will crimp connections, such as welded connections of battery cell posts, and check the electrical continuity of the same.

Other objects and advantages of the present invention will become readily apparent to those skilled in the art from a reading of the following brief descriptions of the drawing figures, detailed descriptions of the preferred embodiments, and the appended claims.

IN THE DRAWINGS

FIG. 2 is an enlarged fragmentary transverse sectional view of a portion of the apparatus illustrated in FIG. 1, taken generally along the line II—II of FIG. 1, and with a portion of the battery component also being illustrated therein.

FIG. 3 is an enlarged view of the crimping device and its driving means being fragmentally illustrated, with the crimping device being partially illustrated in section, for clarity, in order to best show the manner in which the probes and jaws are carried by one of the lever elements of the crimping device.

FIG. 4 is a view of the device of FIG. 3, in clamped relation relative to a battery cell post disposed between probes and jaws of the device.

FIG. 5 is an enlarged sectional view of the apparatus of FIG. 3, taken generally along the line V—V of FIG. 3.

Figure 1:
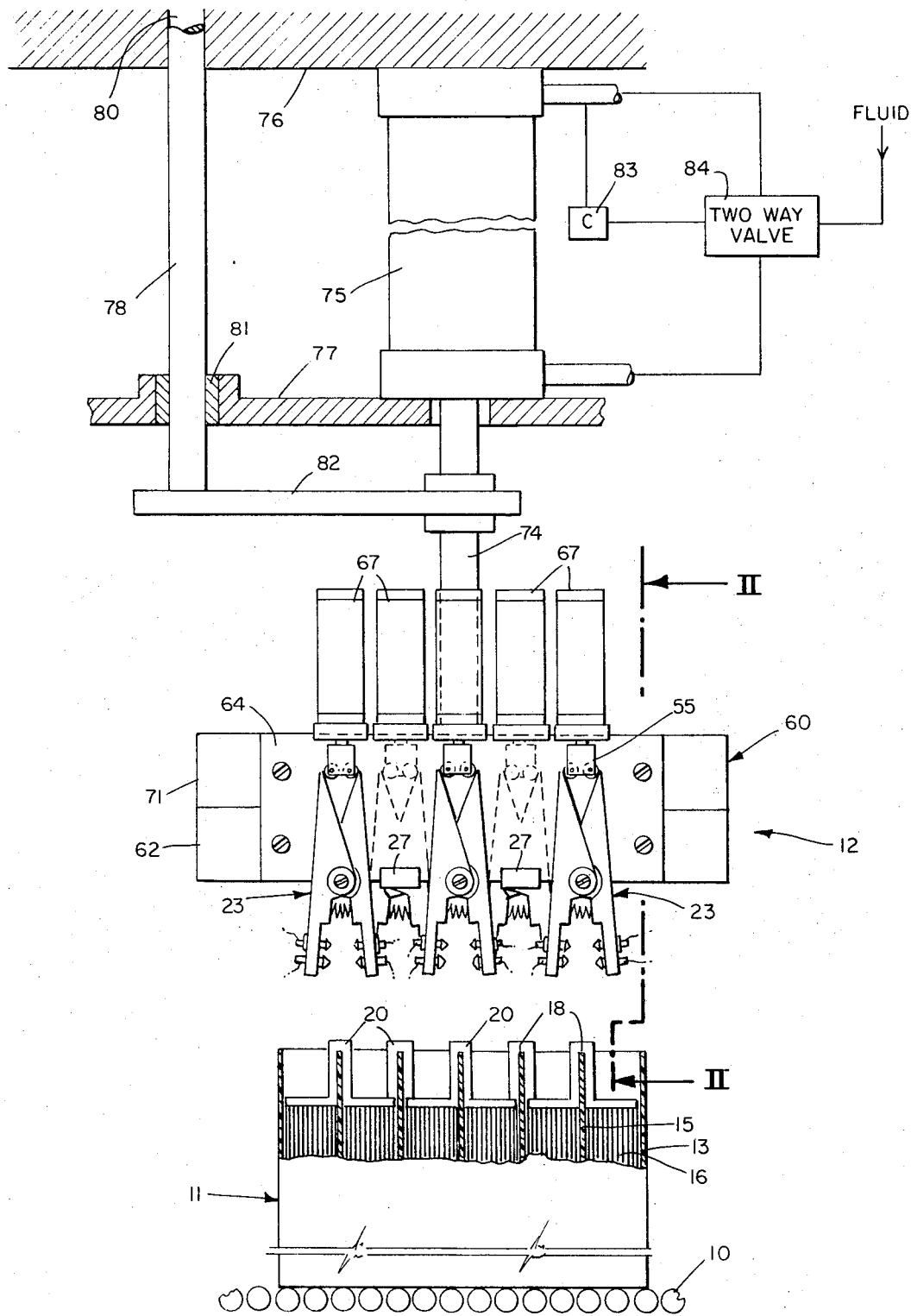
FIG. 1 is a partially schematic, elevational view of an apparatus of this invention, disposed above a battery, about to be crimped and checked, with the battery being partially illustrated in section for the purpose of clarity.

Referring now to the drawings in detail, reference is first made to FIG. 1, wherein there is illustrated a conveyor generally designated by the numeral 10, constructed of rollers, and having a battery 11 disposed thereon directly beneath the apparatus 12 of this invention. The battery 11 includes a casing 13, of a plurality of cells with the cells being separated by partitions 15 extending thereacross in a conventional manner, and with a plurality of battery plates 16 disposed within each cell with each of the plates being connected to a strap 17 by any conventional means, and with a battery post 18 being illustrated, with a weldment thereof extending across the top of a partition 15, and connecting opposite upstanding lugs 20 and 21, disposed adjacent each other on opposite sides of the partition 15. It is the crimping of the posts 18, on opposite sides of the partitions 15, as well as the checking of the conductivity of the weldment extending between and connecting adjacent lugs 20 and 21 of each post 18 to which this invention is directed.

In the device illustrated in FIG. 1, the apparatus 12 carries five crimping devices 23, positioned for each device 23 to engage an associated post 18 of a battery 11 disposed therebeneath. With reference to FIGS. 2 through 5, each device 23 includes a pair of lever elements 24 and 25, having upper portions and lower portions, as illustrated in FIGS. 3 and 4, connected together for pivoting on a bearing-like shoulder 26 of a mounting plate 27. A screw 28 and washer 30 are utilized, with the screw being fitted into the shoulder 26, to hold the lever elements 24 and 25 against an end of the plate 27, as illustrated in FIG. 5. Accordingly, the elements 24 and 25 are mounted each for pivotal movement about the shoulder 26, generally between the positions of the elements as illustrated in FIGS. 3 and 4.

At the lower end of the elements 24 and 25, jaws 31 and 32 are provided, with appropriate chisel points 33 and 34, respectively, with the jaws 31 and 32 having mounting extensions 35 and 36, carried by the lower ends of the elements 24 and 25, respectively, each with an associated electrically insulating member, such as plastic, rubber or the like, for receiving the same. Suitable electrical wires 38 and 40 are provided, for applying a constant current between the jaws 31 and 32, in a manner that will be discussed more fully hereinafter.

Also carried at the lower ends of the elements 24 and 25, are a pair of electrical probes 41 and 42, mounted within insulating members such as that 43 illustrated in FIG. 3, to insulate the probes 41 and 42 from the metal of the lower ends of the elements 24 and 25, with the probes 41 and 42 being spring-biased by means of resilient springs 44 and 45, respectively, such that the probes 41 and 42 are normally urged toward each other, as illustrated in FIGS. 3 and 4, but with the probes 41 and 42, mounted on their supports 46 and 47 being movable outwardly away from each other, against the forces applied by the springs 44 and 45, with the supports 46 and 47 being slidable within the insulation such as that 43 carried in the lower ends of the lever elements 24 and 25.

Another compression spring 48 is provided, suitably mounted as illustrated in FIG. 3, in blind bores, for normally urging the lower ends of the elements 24 and 25, beneath the pivot, outwardly away from each other. The upper portions of the elements 24 and 25 have inner slopes or camming surfaces 50 and 51, respectively for engagement by rollers 52 and 53, respectively, that in turn are mounted in a suitable mounting device 54 that comprises a driving device or means 55, such that, upon movement of the driving means 55 downwardly, whereby the rollers 52 and 53 traverse the camming surfaces 50 and 51, the upper ends of the lever elements 24 and 25 become separated more greatly than that illustrated in FIG. 3, to an amount indicated more clearly in FIG. 4, and with the lower ends of the lever elements 24 and 25 being moved more closely together, with the jaws 31 and 32 becoming rigidly engaged with respectively associated sides 20 and 21 of a battery post 18, with the chisel points 33 and 34 thereof forceably engaging the post 18, and squeezing the middle of the same inwardly, into tight engagement against a partition 15 disposed therebetween. During this crimping action, the probes 41 and 42 engage upper portions of the post 18, opposite each other, as illustrated in FIG. 4, under a substantially uniform force as provided by the springs 44 and 45, in order to maintain substantially uniform contact of electrical probes 41 and 42 with posts 18, in order to accommodate variations in thicknesses of the posts 18, from one to another. This is possible because the probes 41 and 42 are free to move laterally, or slide partially outwardly away from each other, through the elements 24 and 25, as will be clear with reference to the relative positions of the probes 41 and 42 between the illustrations of FIGS. 3 and 4.

The probes 41 and 42 are provided with electrical wires 56 and 57 connected thereto, for a purpose that will be explained more fully hereinafter.

Each of the devices 23 is substantially identical in construction, so the details of all of the devices 23 illustrated in FIG. 1 will not be duplicated herein. Furthermore, the details of the various driving means are all substantially identical.

It will be noted that the mounting plates 27 are connected to a suitable carrying means 60 by means of a threaded bolt 61 engaged within an inverted U-section channel 62 of the mounting means 60, by means of a threaded net 63 disposed therein, as illustrated in FIG. 2, with the channel 62 being secured to a carrier plate 64 by suitable screws 65. The mounting of all of the plates 27 for the various devices 23 is also substantially identical, differing only as to side of the carrying device 60 on which the device 23 is to be mounted, or as to relative lateral position of mounting, as viewed in FIG. 1.

Each driving means 55 is carried on an associated piston rod 66, that in turn is carried by a piston (not shown) of a suitable hydraulic, pneumatic cylinder 67 or the like, for free passage of the rod 66 through an opening 68 of a mounting plate 70. The mounting plate 70 is, in turn, carried by the carrying means 60, specifically being secured to a U-section channel member 71 by means of a threaded bolt 72 passing therethrough and in engagement with a nut 73, as illustrated, with the channel member 71 being secured to the plate 64 by threaded fasteners 65.

The cylinders 67 and their mounting plates 70 are positioned relative to the devices 23, for actuation of the devices 23, as aforesaid. Also, an individual cylinder 67 is provided for each driving means 55, and consequently for each crimping device 23, and the cylinders 67 are thus individually actuable, although the same are generally substantially concurrently actuated as will be discussed hereinafter.

The entire carrying means 60 is mounted for movement with a rod 74 that is secured to the upper channel 71 by any suitable means (not shown), with the rod 74 comprising an extension of a piston rod of a hydraulic, pneumatic cylinder 75 or the like. The cylinder 75 is mounted on a support 76, and on a guide support 77. A guide connector 78 is provided, slidably mounted within a bore 80 of the support 76, and extending through a bushing 81 of the guide support 77, for sliding engagement therewith, and with a guide connecting plate 82 carried at the lower end of the rod 78, and connected to the rod 74, for lateral support of the rod 74, during its upward and downward movement, during the positioning of the carrying means 60. The cylinder 75 may be actuated manually, or if desired, in a predetermined sequence by any suitable control, switching arrangement or the like 83, that actuates a valve 84 for controlling the distribution of hydraulic, pneumatic fluid or the like to upper or lower sides of a piston within the cylinder 75.

Figure 6:
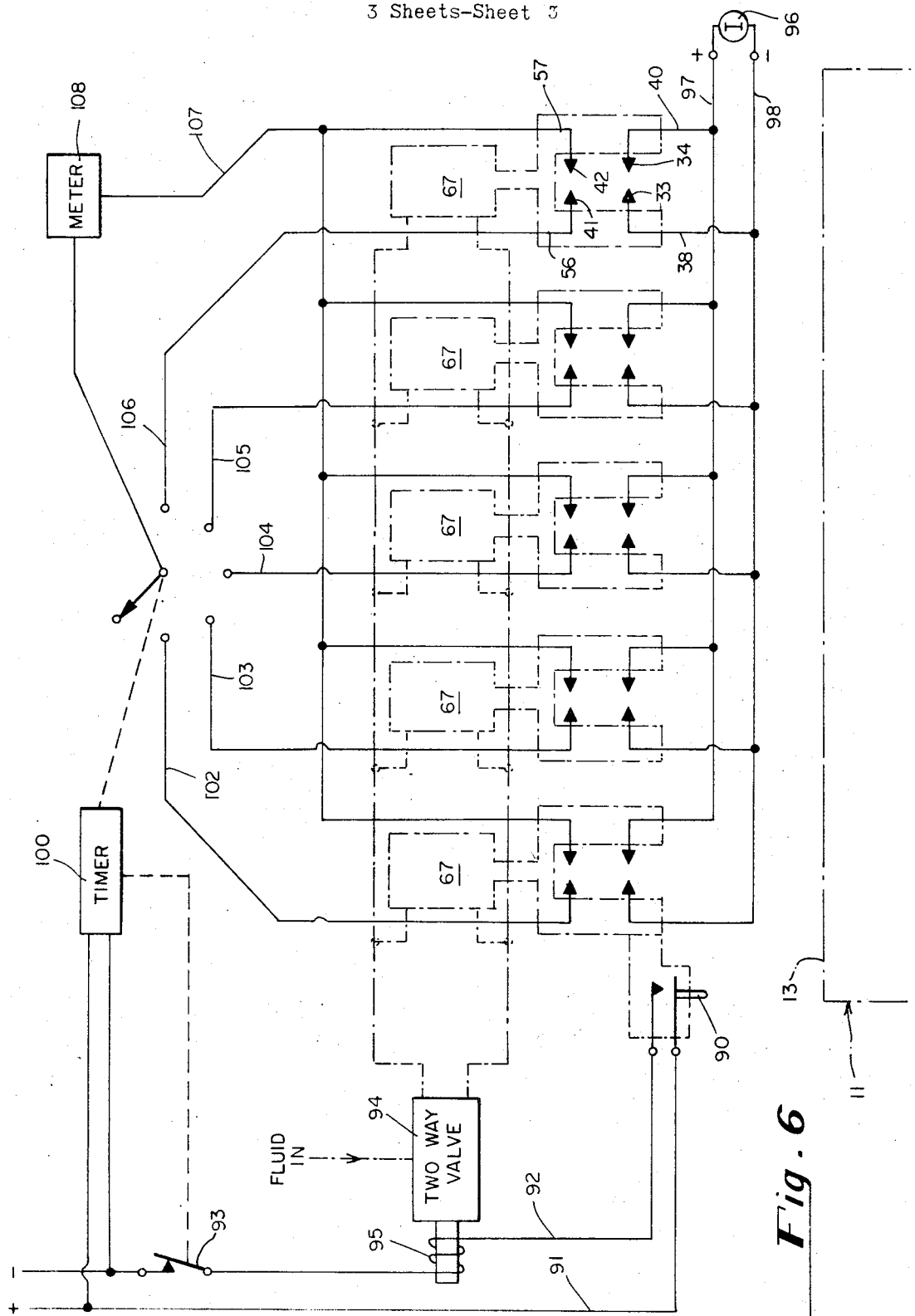
FIG. 6 is a schematic view of the operation systems of this invention.

With particular reference to FIGS. 1 and 6, the operation of the apparatus of this invention will be readily apparent.

Upon a battery 11 reaching an appropriate position beneath the structure that carries the crimping devices 23, the battery 11 will be stopped in its movement along the conveyor 10 at a precise location. Then, the cylinder 75 will be actuated either manually, or automatically, as desired, in order to commence downward movement of the carrying means 60. Upon the carrying means 60 reaching a desired downward position, a switch 90 carried thereby is provided, for striking the casing 13 of the battery 11, for closing a circuit in lines 91, 92, that is provided with a source of potential as illustrated in FIG. 6, and with the switch 93, already in a closed position, for actuation of the valve 94 by means of a solenoid 95 or the like, with the valve 94 providing a driving fluid for the actuation means or cylinders 67, whereby the driving means 55 all become actuated substantially concurrently, to spread the upper ends of the lever elements 24 and 25 of the devices 23, and whereby the lower ends of each of the devices 23 move toward each other, such devices 23 already having been positioned adjacent posts 18 with which they are to become engaged, by virtue of the downward movement of the carrying means 60, and with the devices 55 thereby causing the jaws 33 and 34 to become engaged on opposite sides of posts 18, as well as causing probes 41 and 42 to become engaged as illustrated in FIG. 4, on opposite sides of posts 18.

A constant current source 96 is provided across lines 97 and 98, in order to provide current through lines 40 and 38, to the jaws 31 and 32.

At this time, the chisel points 33 and 34 are operative to effect a crimping action of the sides 20 and 21 of the posts 18, with partitions 15 disposed therebetween.

Upon closing of the circuit between lines 91 and 92 by means of a switch 90, a timer 100 is actuated that is operative, after uniform engagement of the posts 18 by the probes 41 and 42 as aforesaid, to commence sequential movement of a switch element 101 to individual ones of the circuit loops 102, 103, 104, 105 and 106, in serial fashion, one after the other, whereby an appropriate probe line 56 may have its circuit completed through the weldment of a post 18, through a probe line 57, through a line 107, and to a meter 108, whereby an indication on the meter 108 is indicative of the resistance between the probes 41 and 42, of each of the devices 23, one after another, as mentioned above.

The meter 108 is actually a volt meter, for measuring the voltage provided between the probes 41 and 42 under the constant current provided by the source 96, and with the voltage being a function of the current and the resistance between the probes 41 and 42, the meter 108 may be calibrated to give a reading of the resistance between the probes 41 and 42.

It will further be noted that in lieu of a calibrated meter as such, a preliminary setting may be made that would actuate a bell, light or the like, that in itself, is set to be operated upon the resistance between the probes 41 and 42 reaching a predetermined level of unacceptability, in instances when a precise resistance reading is not particularly desired.

Upon the switch 101 traversing the circuits indicated, the timer 100 will then cause the switch 93 to open thereby deenergizing the solenoid 95, in order for the actuation means 67 to be reversed, for withdrawal of the driving means 55, and opening of the devices 23 at their lower ends, in order to permit the probes and jaws to be removed from the battery posts. Also, after such upward movement of the devices 55, the timer 100 can permit the switch 93 to close, in order to be ready for re-use. Finally, the timer 100 may, if desired, actuate appropriate control circuitry 83 or the like, for actuation of the valve 84, for actuation of the cylinder 75 in turn, in order to permit upward movement of the carrying means 60. In the alternative, if complete mechanization regarding upward movement of the carrying means 60 is not desired, the same may be done by any manual means.

While the particular circuitry of FIG. 6 is illustrated for purposes of example only, it will be apparent that any suitable circuitry may be utilized, if desired, in order to obtain the desired result.

It will also be seen that the desired ends of this invention may be accomplished, for crimping of connections, and for checking the electrical continuity of post weldments of posts of lead acid sturge batteries, or of other devices, as desired.

It will also be apparent that various types of meters may be utilized, as well as various types of rotary switching may be utilized, other than those disclosed in FIG. 6 herein, as are desired.

Various modifications may be made in the details of construction, as well as in the use and operation of the devices of this invention, as well as in the procedures set forth herein, all within the spirit and scope of the invention as recited in the appended claims.

What is claimed is:

1. Apparatus for crimping battery cell posts comprising a crimping device having a pair of crimping elements having at least portions mounted for movement toward and away from each other, and each element having a crimping jaw mounted on said portions for movement of the jaws toward and away from each other for engagement of a battery post therebetween, means carrying the crimping device, means for moving the carrying means for relative movement toward the battery post to be crimped and return therefrom, and means effective while engaging said elements for driving said crimping elements for movement of said portions thereof to post-crimping positions of said jaws.

2. The apparatus of claim 1, wherein there are a plurality of said crimping devices, each carried by said carrying means.

3. Apparatus for crimping battery cell posts comprising a crimping device having a pair of crimping elements and each element having a crimping jaw mounted thereon for relative movement between the jaws for engagement of a battery post therebetween, means carrying the crimping device, means for moving the carrying means for relative movement toward the battery post to be crimped and return therefrom, and means effective while engaging said elements for driving said crimping elements to post-crimping positions of said jaws, wherein the said elements of a pair are pivotally connected together and said driving means comprise camming surface means on said clamping elements at opposite ends of said elements from said jaws across the pivotal connection of said elements, including cam means for engaging said camming surface means, including actuation means for moving said cam means along said camming surface means for closing said crimping jaws.

4. Apparatus for crimping battery cell posts comprising a crimping device having a pair of crimping elements and each element having a crimping jaw mounted thereon for relative movement between the jaws for engagement of a battery post therebetween, means carrying the crimping device, means for moving the carrying means for relative movement toward the battery post to be crimped and return therefrom, and means effective while engaging said elements for driving said crimping elements to post-crimping positions of said jaws, wherein the said elements of a pair are pivotally connected together and said driving means comprise camming surface means on said clamping elements at opposite ends of said elements from said jaws across the pivotal connection of said elements, including cam means for engaging said camming surface means, including actuation means for moving said cam means along said camming surface means for closing said crimping jaws, wherein there are a plurality of said crimping devices, each carried by said carrying means, and wherein an individual actuation means is provided for each said device.

5. Apparatus for crimping battery cell posts comprising a crimping device having a pair of crimping elements and each element having a crimping jaw mounted thereon for relative movement between the jaws for engagement of a battery post therebetween, means carrying the crimping device, means for moving the carrying means for relative movement toward the battery post to be crimped and return therefrom, and means effective while engaging said elements for driving said crimping elements to post-crimping positions of said jaws, wherein there are a plurality of said crimping devices, each carried by said carrying means, wherein individual driving means are provided for each said device and wherein means are provided for concurrent actuation of each said driving means for concurrent crimping of a plurality of battery posts.

6. The apparatus of claim 5, wherein an individual actuation means is provided for each said device.

7. Apparatus for crimping battery cell posts comprising a crimping device having a pair of crimping elements and each element having a crimping jaw mounted thereon for relative movement between the jaws for engagement of a battery post therebetween, means carrying the crimping device, means for moving the carrying means for relative movement toward the battery post to be crimped and return therefrom, and means effective while engaging said elements for driving said crimping elements to post-crimping positions of said jaws, wherein there are a plurality of said crimping devices, each carried by said carrying means, wherein means are provided for concurrent actuation of said driving means for concurrent crimping of a plurality of battery posts, and with means being provided for facilitating a path of electrical current flow of a preselected current magnitude through said jaws and posts being crimped therebetween.

8. The apparatus of claim 7, wherein means are provided on said elements, by which the jaws are carried, for electrically insulating said jaws from said elements with which they are associated.

9. Apparatus for crimping battery cell posts comprising a crimping device having a pair of crimping elements and each element having a crimping jaw mounted thereon for relative movement between the jaws for engagement of a battery post therebetween, means carrying the crimping device, means for moving the carrying means for relative movement toward the battery post to be crimped and return therefrom, and means effective while engaging said elements for driving said crimping elements to post-crimping positions of said jaws, wherein there are a plurality of said crimping devices, each carried by said carrying means, wherein means are provided for concurrent actuation of said driving means for concurrent crimping of a plurality of battery posts, and including tests probes carried by each said element of each said device, for movement of the probes of each device toward and away from each other upon relative movement of the elements of a device, with the probes of each device being located on its associated elements for engaging a battery post therebetween upon movement of the probes toward each other, and with means facilitating a path of electrical current flow through said probes and posts engaged therebetween.

10. The apparatus of claim 9, including in the combination a means for sequentially checking the acceptability of the electrical resistance across the posts weldments thereof between probes engaged therewith.

11. The apparatus of claim 10, including means carried by said carrying means and responsive to engagement with a battery for initiating operation of said actuation means and for initiating operation of said sequential checking means.

12. The apparatus of claim 9, wherein said probes are provided with means electrically insulating them from elements by which they are carried.

13. The apparatus of claim 12, wherein resilient mounting means are provided for mounting said probes on said element for substantially uniform contacting force relative to posts to be engaged therebetween.

14. The apparatus of claim 4, wherein individual driving means are provided for each said device and wherein means are provided for concurrent actuation of each said driving means for concurrent crimping of a plurality of battery posts, and wherein means are provided for electrically insulating said jaws from associated said elements by which the jaws are carried, and including test probes carried by each said element of each said device, for movement of the probes of each device toward and away from each other upon relative movement of the elements of a device, with the probes of each device being located on its associated elements for engaging a battery post therebetween upon movement of the probes toward each other, and with means facilitating a path of electrical current flow through said probes and posts engaged therebetween, including in the combination means for sequentially checking the acceptability of the electrical resistance across the post weldments thereof between probes engaged therewith, including means carried by said carrying means and responsive to engagement with a battery for initiating operation of said actuation means and for initiating operation of said sequential checking means, and wherein said probes are provided with means electrically insulating them from elements by which they are carried, and wherein resilient mounting means are provided for mounting said probes on said element for substantially uniform contacting force relative to posts to be engaged therebetween.

15. Apparatus for engaging battery cell posts and checking the acceptability of the electrical resistance across posts weldments thereof comprising a plurality of devices each having a pair of elements thereof, and including test probes carried by each said element of each said device, for movement of the probes of each device toward and away from each other upon relative movement of the elements of a device, with the probes of each device being located on its associated elements for engaging a battery post therebetween upon movement of the probes toward each other, and with means facilitating a path of electrical current flow through said probes and posts engaged therebetween, means carrying said devices, means for moving the carrying means for relative movement toward the posts to be checked and returned therefrom, and means effective while engaging said elements for driving said elements to post-engaging positions of said probes, and including in the combination means for concurrent actuation of said driving means.

16. The apparatus of claim 15, wherein the means for checking the acceptability of the electrical resistance across the post weldments thereof between probes engaged therebetween comprise sequential checking means.

17. The apparatus of claim 16, including means carried by said carrying means and responsive to engagement with a battery for initiating operation of said actuation means and for initiating operation of said sequential checking means.

18. Apparatus for effecting the simultaneous crimping of electrical connections comprising a crimping device having a pair of crimping elements and each element having a crimping jaw mounted thereon for movement of the jaws toward and away from each other for engagement of the electrical connection therebetween, means carrying the crimping device, means moving and carrying means for relative movement toward the electrical connection to be crimped and returned therefrom, and means effective while engaging said elements for driving said crimping elements to connection crimping positions of said jaws, wherein there are a plurality of said crimping devices, each carried by said carrying means, and wherein means are provided for concurrent actuation of said driving means, for concurrent crimping of the plurality of electrical connections.

19. The apparatus of claim 18, including test probes carried by each said element of each said device, for movement of the probes of each device toward and away from each other upon relative movement of the elements of the device, with the probes of each device being located on its associated elements for engaging an electrical connection therebetween upon movement of the probes toward each other, and with means facilitating a path of electrical current flow through said probes and electrical connection engaged therebetween, and including in the combination means for sequentially checking the acceptability of the electrical resistance across the electrical connection between probes engaged therewith.

20. In the art of multicell battery manufacture wherein batteries include partitions between adjacent cells thereof and wherein plates in each cell are electrically connected to lugs, with lugs of adjacent cells extending upward along opposite sides of a partition disposed therebetween and with these adjacent lugs being welded together across the top of a partition to form battery cell posts, the method of securing cell posts to partitions disposed therebetween comprising the steps of providing a plurality of clamping devices corresponding in number to the number of posts desired to be secured to partitions, with the devices being mounted on a common carrier, concurrently lowering all of the devices on the carrier toward associated posts, with jaws of the devices open, until jaws of the devices are alongside portions of posts that have an associated partition therebetween, and actuating the devices for concurrent engagement of jaws of the devices with the posts under a desired crimping force.

* * * * *